United States Patent
Toy et al.

(10) Patent No.: US 12,117,635 B2
(45) Date of Patent: Oct. 15, 2024

(54) OPTICAL STACK

(71) Applicant: 3M INNOVATIVE PROPERTIES COMPANY, St. Paul, MN (US)

(72) Inventors: Michelle L. Toy, North St. Paul, MN (US); Kristy A. Gillette, Spring Valley, WI (US); Matthew B. Johnson, Woodbury, MN (US); Eileen M. Franey, Woodbury, MN (US); Carley A. Haroldson, Centerville, MN (US); Joseph P. Attard, Woodbury, MN (US); Guy M. Kallman, Woodbury, MN (US); William Blake Kolb, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 356 days.

(21) Appl. No.: 17/438,245

(22) PCT Filed: Apr. 28, 2020

(86) PCT No.: PCT/IB2020/053987
§ 371 (c)(1),
(2) Date: Sep. 10, 2021

(87) PCT Pub. No.: WO2020/222117
PCT Pub. Date: Nov. 5, 2020

(65) Prior Publication Data
US 2022/0187521 A1    Jun. 16, 2022

Related U.S. Application Data

(60) Provisional application No. 62/840,681, filed on Apr. 30, 2019.

(51) Int. Cl.
*G02B 27/01*    (2006.01)
*G02B 5/30*    (2006.01)

(52) U.S. Cl.
CPC ......... *G02B 5/305* (2013.01); *G02B 27/0101* (2013.01); *G02B 2027/012* (2013.01)

(58) Field of Classification Search
CPC ........................... G02B 5/305; G02B 27/0101
See application file for complete search history.

(56) References Cited

U.S. PATENT DOCUMENTS 2,526,327 A    10/1950 Carlson
3,610,729 A    10/1971 Rogers
(Continued)

FOREIGN PATENT DOCUMENTS

JP    2016521645 A    7/2016
JP    2021511985 A    5/2021
(Continued)

OTHER PUBLICATIONS

International Search Report for PCT International Application No. PCT/IB2020/053987, mailed on Oct. 15, 2020, 7 pages.

*Primary Examiner* — Bao-Luan Q Le
(74) *Attorney, Agent, or Firm* — Clifton F. Richardson

(57) ABSTRACT

An optical stack includes an optical film (200) and an optical adhesive (500) disposed on the optical film. The optical adhesive has a major structured surface facing away from the optical film that includes a plurality of channels formed therein. The channels define a plurality of substantially flat land regions therebetween. The land regions include at least about 50% of a total surface area of the major structured surface. When the optical stack is placed on a support surface with the major structured surface of the optical adhesive contacting the support surface, the optical stack bonds to the support surface and may be removed from, or slidingly repositioned on, the support surface without damage to the optical adhesive or the support surface, and upon application of at least one of heat and pressure, the optical (Continued)

stack substantially permanently bonds to the support surface and the plurality of channels substantially disappear.

15 Claims, 7 Drawing Sheets

(56) References Cited

U.S. PATENT DOCUMENTS

| | | |
|---|---|---|
| 4,446,305 A | 5/1984 | Rogers |
| 4,540,623 A | 9/1985 | Im |
| 5,103,337 A | 4/1992 | Schrenk |
| 5,296,277 A | 3/1994 | Wilson |
| 5,360,659 A | 11/1994 | Arends |
| 5,434,384 A | 7/1995 | Koontz |
| 5,448,404 A | 9/1995 | Schrenk |
| 5,592,188 A | 1/1997 | Doherty |
| 5,882,774 A | 3/1999 | Jonza |
| 6,132,882 A | 10/2000 | Landin |
| 6,157,490 A | 12/2000 | Wheatley |
| 6,180,921 B1 | 1/2001 | Boaz |
| 6,797,396 B1 | 9/2004 | Liu |
| 6,827,886 B2 | 12/2004 | Neavin |
| 8,921,739 B2 | 12/2014 | Petrenko |
| 9,715,110 B1 | 7/2017 | Brown |
| 9,823,395 B2 | 11/2017 | Weber |
| 11,491,768 B2* | 11/2022 | Ishikawa ........... B32B 17/10853 |
| 2003/0016334 A1 | 1/2003 | Weber |
| 2003/0178124 A1* | 9/2003 | Mikami ............. B32B 38/0012 156/247 |
| 2005/0002097 A1 | 1/2005 | Boyd |
| 2005/0270655 A1 | 12/2005 | Weber |
| 2006/0057367 A1 | 3/2006 | Sherman |
| 2006/0246296 A1 | 11/2006 | Xia |
| 2007/0039271 A1 | 2/2007 | Fleming |
| 2007/0212535 A1 | 9/2007 | Sherman |
| 2007/0279755 A1 | 12/2007 | Hitschmann |
| 2008/0203078 A1 | 8/2008 | Huerter |
| 2011/0297661 A1 | 12/2011 | Raghavan |
| 2012/0243104 A1 | 9/2012 | Chen |
| 2015/0080529 A1 | 3/2015 | Zhu |
| 2015/0160529 A1 | 6/2015 | Popovich |
| 2015/0277172 A1 | 10/2015 | Sekine |
| 2016/0114568 A1 | 4/2016 | Sher |
| 2016/0115356 A1 | 4/2016 | Free |
| 2016/0130485 A1 | 5/2016 | Free |
| 2017/0362469 A1 | 12/2017 | Sherman |
| 2018/0074340 A1 | 3/2018 | Robbins |
| 2018/0257346 A1* | 9/2018 | Austin ................... C09J 183/04 |
| 2018/0284440 A1 | 10/2018 | Popovich |
| 2019/0051733 A1 | 2/2019 | Zang |
| 2019/0196076 A1 | 6/2019 | Stover |
| 2021/0039360 A1* | 2/2021 | Ishikawa ........... B32B 17/10816 |

FOREIGN PATENT DOCUMENTS

| | | |
|---|---|---|
| WO | WO 1996-019347 | 6/1996 |
| WO | WO 2013-176815 | 11/2013 |
| WO | 2014197194 W | 12/2014 |
| WO | 2015152351 A1 | 10/2015 |
| WO | WO 2017-205106 | 11/2017 |
| WO | 2018226662 A1 | 12/2018 |
| WO | WO 2019-145860 | 8/2019 |
| WO | WO 2019-193501 | 10/2019 |
| WO | WO 2020-016703 | 1/2020 |
| WO | WO 2020-068513 | 4/2020 |
| WO | WO 2020-202033 | 10/2020 |

* cited by examiner

OPTICAL STACK

CROSS REFERENCE TO RELATED APPLICATIONS

This application is a national stage filing under 35 U.S.C. 371 of PCT/IB2020/053987, filed Apr. 28, 2020, which claims the benefit of Provisional Application No. 62/840,681, filed Apr. 30, 2019, the disclosure of which is incorporated by reference in its/their entirety herein.

BACKGROUND

An automotive windshield may be a glass laminate including an optical film disposed between, and bonded to, two glass layers. The optical film may be a reflective polarizer for reflecting an image projected onto the windshield.

SUMMARY

In some aspects of the present description, an optical stack including an optical film and an optical adhesive disposed on the optical film is provided. The optical film includes a plurality of alternating first and second polymeric layers numbering at least 50 in total where each first and second polymeric layer has an average thickness less than about 500 nm. The optical adhesive includes a first major surface facing and bonded to the optical film, and an opposing second major structured surface including a plurality of irregularly arranged intersecting channels formed therein. The channels define a plurality of substantially flat land regions therebetween where the land regions include at least about 50% of a total surface area of the second major structured surface. When the optical stack is placed on a support surface with the second major structured surface of the optical adhesive contacting the support surface, the optical stack bonds to the support surface and may be removed from, or slidingly repositioned on, the support surface without damage to the optical adhesive or the support surface, and upon application of at least one of heat and pressure, the optical stack substantially permanently bonds to the support surface and the plurality of channels substantially disappear.

In some aspects of the present description, an optical stack including an optical film and an optical adhesive adhered to the optical film is provided. The optical adhesive includes a first major surface facing away from the optical film. The first major surface includes a plurality channels formed therein where each channel includes a side wall extending upwardly beyond a portion of the first major surface adjacent the channel to define a ridge substantially co-extensive with the channel along at least a portion of a length of the channel. When the optical stack is placed on a support surface with the first major surface of the optical adhesive contacting the support surface, the optical stack bonds to the support surface and may be removed from, or slidingly repositioned on, the support surface without damage to the optical adhesive or the support surface, and upon application of at least one of heat and pressure, the optical stack substantially permanently bonds to the support surface and the plurality of channels and ridges substantially disappear.

In some aspects of the present description, an automotive windshield including an optical stack disposed between, and bonded to, an interior glass substrate and an exterior glass substrate is provided. The optical stack includes an optical film including a plurality of alternating first and second polymeric layers numbering at least 50 in total where each first and second polymeric layer have an average thickness less than about 500 nm. The optical stack further includes a first optical adhesive bonding the optical film to the interior glass substrate, the first optical adhesive having an average thickness in the range of about 10 micrometers to about 100 micrometers and having a sound absorbing property for reducing noise in an interior of a motor vehicle, such that a ratio of a loss modulus G" to a storage modulus G' of the optical adhesive for frequencies in a range from about 1000 Hz to about 3200 Hz is greater than about 0.3.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Figure 1A:
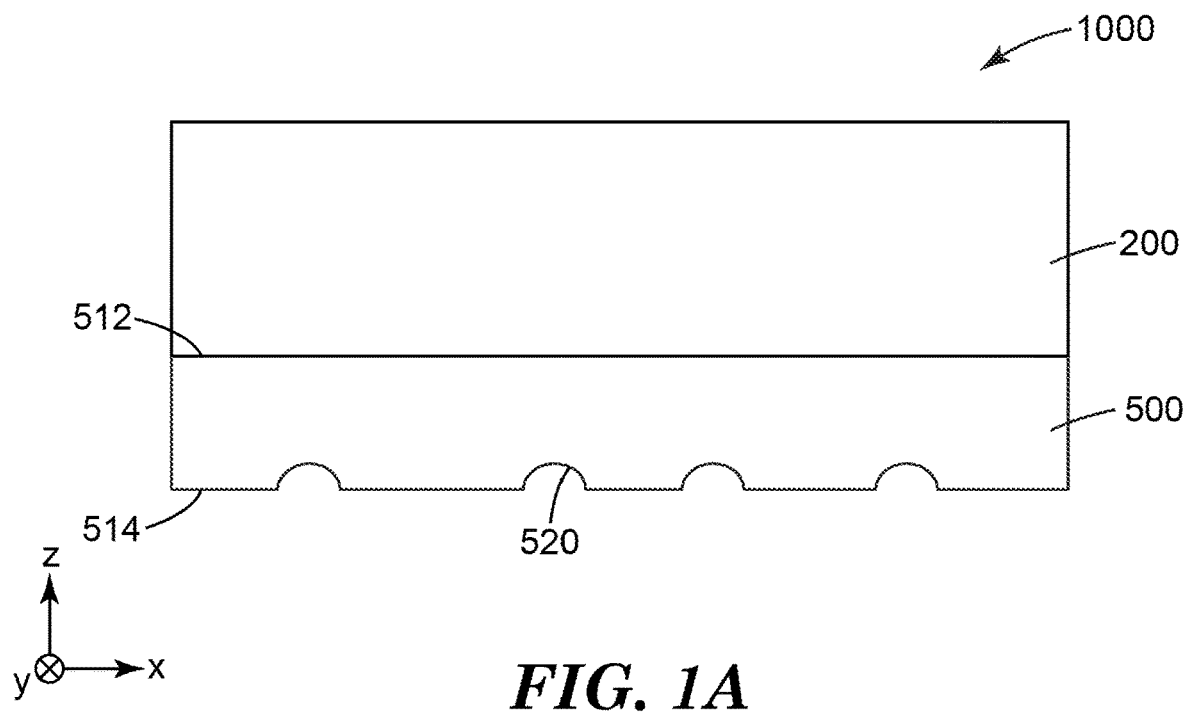
FIG. 1A is a schematic cross-sectional view of an optical stack.
Figure 1B:
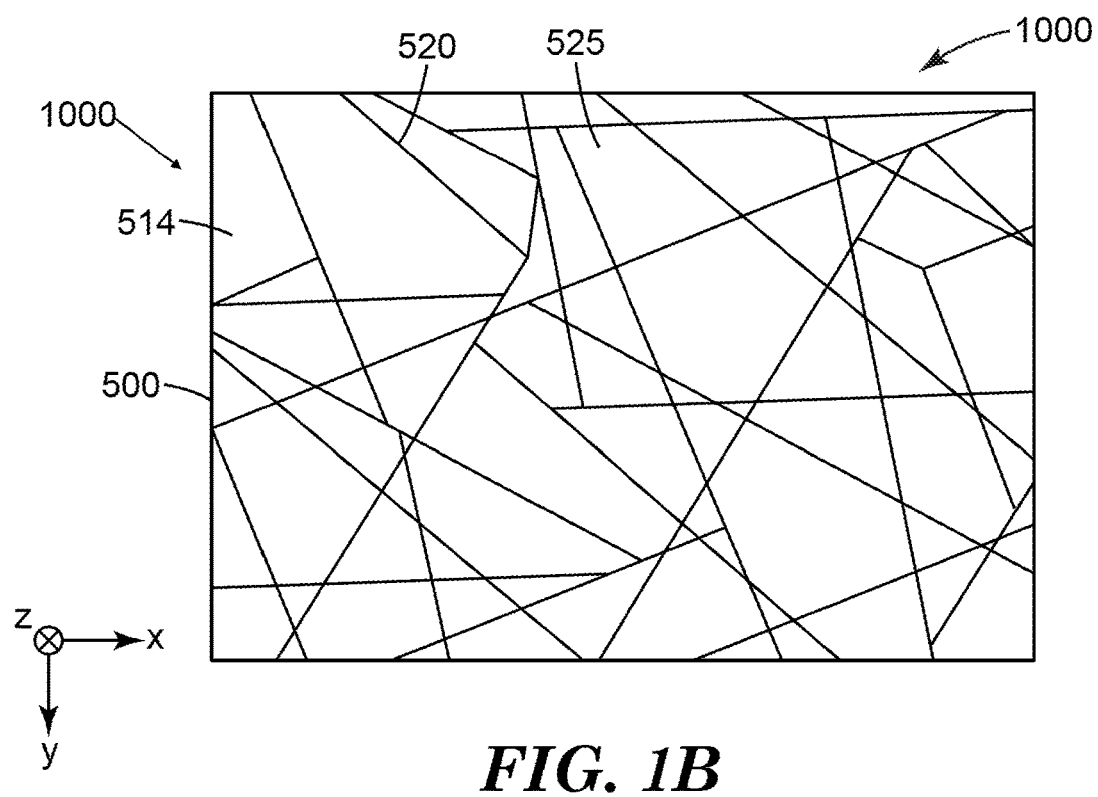
FIGS. 1B-1C are schematic bottom views of optical stacks.

FIGS. 1A-1B are a schematic cross-sectional and bottom views, respectively, of an optical stack 1000 including an optical film 200 and an optical adhesive 500 disposed on the optical film 200. The optical adhesive 500 includes a first major surface 512 facing and bonded to the optical film 200, and an opposing second major structured surface 514 including a plurality of irregularly arranged intersecting channels 520 formed therein. An optical adhesive typically has a high transmittance for visible light (e.g., an average optical transmittance in the wavelength range of 400 nm to 700 nm of at least 70%, or at least 80%, or at least 90%)) and a low haze (e.g., a haze of less than 5%, or less than 3%, or less than 2%, or less than 1%). The transmittance and haze can be determined as described in the ASTM D1003-13 test standard, for example. The channels 520 define a plurality of substantially flat land regions 525 therebetween. The land regions 525 make up at least about 50% of a total surface area of the second major structured surface 514. In some embodiments, when the optical stack 1000 is placed on a support surface (e.g., a surface of a glass substrate) with the second major structured surface 514 of the optical adhesive 500 contacting the support surface, the optical stack 1000 bonds to the support surface and may be removed from, or slidingly repositioned on, the support surface without damage to the optical adhesive 500 or the support surface, and upon application of at least one of heat and pressure (e.g., in some cases, both heat and pressure), the optical stack 1000 substantially permanently bonds to the support surface (e.g., bonded to such an extent that separating the optical stack and the support surface by peeling, for example, would cause damage to at least one of the optical stack or the support surface) and the plurality of channels substantially disappear (e.g., not visible to a person having 20/20 vision in ordinary daylight conditions). As described further elsewhere herein, the optical film 200 may include a plurality of alternating first and second polymeric layers numbering at least 50 in total, where each first and second polymeric layer has an average thickness less than about 500 nm.

Figure 1C:
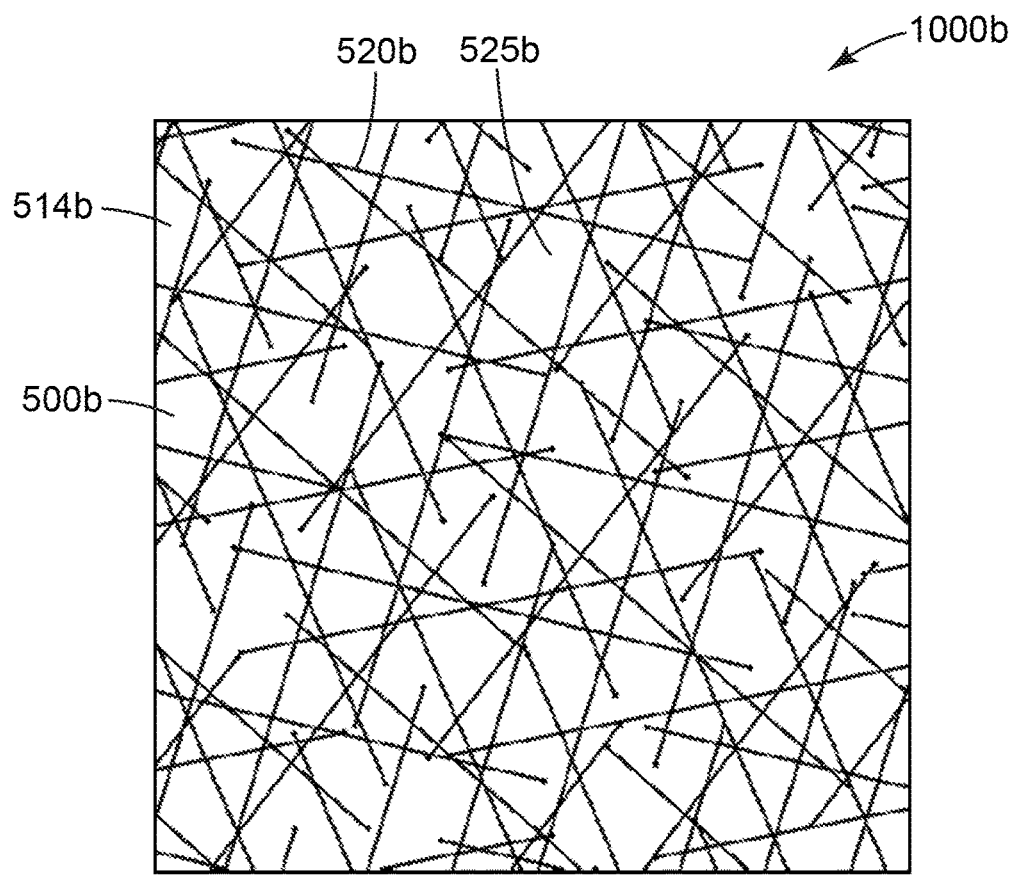

FIG. 1C is a schematic bottom view of an optical stack 1000b which corresponds to optical stack 1000 except that the structured surface 514b of the adhesive 500b includes a different pattern of channels 520b and land regions 525b. In some embodiments, the average channel length of the channels 520b is less than a smaller of a width and a length of the optical stack 1000b.

In some embodiments, each channel in the plurality of irregularly arranged intersecting channels is substantially straight. A channel may be described as substantially straight if any radius of curvature of a line or curve extending along the length of the channel is at least 3 times, or at least 5 times, or at least 10 times the length of the channel.

The irregularly arranged channels may be randomly arranged or pseudo-randomly arranged, for example. A pseudo-random arrangement may appear random but may have been created by an underlying deterministic procedure.

Adhesive coated optical films can be prepared by direct coating onto the optical film or transfer coating/lamination to the optical film, for example.

In the case of direct coating, substrates can be prepared by applying the adhesive onto the optical film through known coating processes such as slot die, slot fed knife, gravure, slide or curtain coating or other methods known in the art. Adhesives can be coated from solvent, water or as 100 percent solids formulations to yield coating thicknesses in the range of 5-127 micrometers, for example. Applicable chemistries include radiation-curable, thermoplastic, or thermoset polymer formulations or combinations thereof. To aid in adhesion to substrate, the optical film may be pre-treated with primer coating or surface treated (e.g., plasma, corona, flame) or other methods known in the art.

In the case of transfer coating or lamination of adhesive onto the optical film, the adhesive can be first coated onto a releasable substrate by similar coating processes described elsewhere. The release-coated substrate containing adhesive can be laminated to the optical film under pressure and temperature such that the adhesive is fully transferred from the release substrate to the optical film upon removal of release substrate. To aid in adhesion to substrate, the optical film may be pre-treated with primer coating or surface treated (plasma, corona, flame) or other methods known in the art.

Figure 2A:
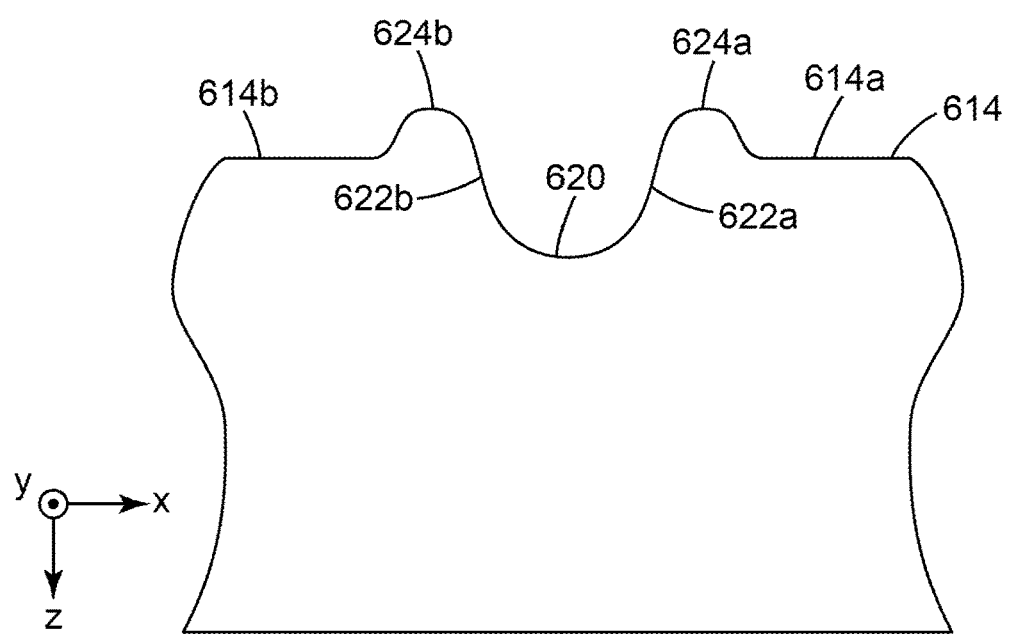
FIG. 2A is a schematic cross-sectional view of a portion of an optical adhesive.
Figure 2B:
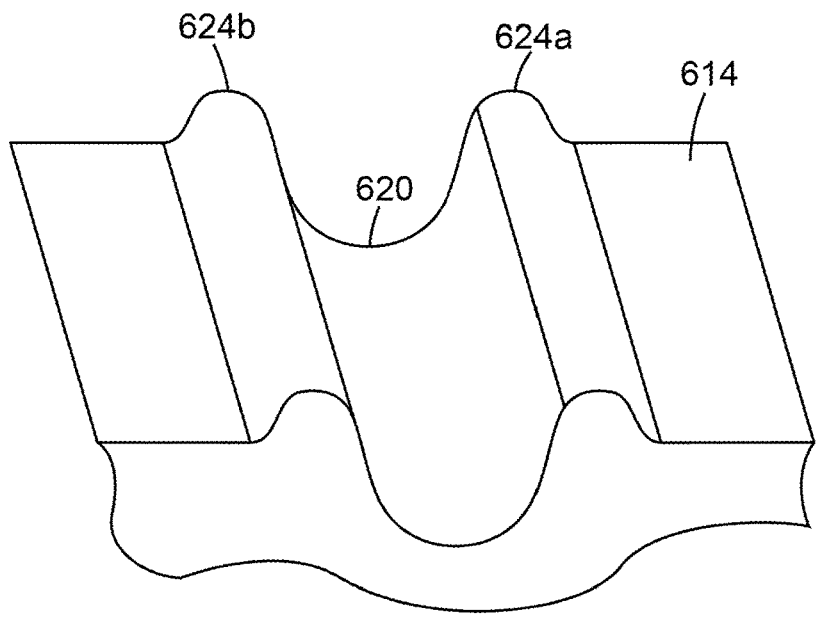
FIG. 2B is a schematic perspective view of a portion of a major surface of an optical adhesive.

FIG. 2A is a schematic cross-sectional view of a portion of an optical adhesive 600 having a first major surface 614 (which may correspond to second major structured surface 514, for example) including a plurality of channels for therein (a single channel 620 is schematically shown for the portion illustrated in FIGS. 2A-2B). The plurality of channels may be a plurality of irregularly arranged intersecting channels as described elsewhere herein or other channel geometries may be used (e.g., a periodic or non-periodic one-dimensional array of non-intersecting channels, or a periodic two-dimensional array of intersecting channels). FIG. 2B is a schematic perspective view of a portion of the first major surface 614. In some embodiments, each channel 620 includes a side wall 622a (resp., 622b) extending upwardly beyond a portion 614a (resp., 614b) of the major surface 614 to define a ridge 624a (resp., 624b) substantially co-extensive with the channel 620 along at least a portion of a length of the channel 620 (e.g., extending along greater than half or greater than 70% or greater than 80% of the length of the portion).

Upwardly in this context can be understood to be relative to the channel: the ridges 624a and 624b are upward relative to the bottom portion of the channel 620. Spatially related terms such as upward encompass different orientations of the article in use or operation in addition to the particular orientations depicted in the figures and described herein.

In some embodiments, an optical stack includes an optical film and optical adhesive 600 adhered to the optical film with the first major surface 614 facing away from the optical film. For example, optical adhesive 600 can be used as the optical adhesive 500 in optical stack 1000. In some embodiments, when the optical stack is placed on a support surface with the first major surface 614 of the optical adhesive 600 contacting the support surface, the optical stack bonds to the support surface and may be removed from, or slidingly repositioned on, the support surface without damage to the optical adhesive 600 or the support surface, and upon application of at least one of heat and pressure, the optical stack substantially permanently bonds to the support surface and the plurality of channels 620 and ridges 624a, 624b substantially disappear.

Figure 3A:
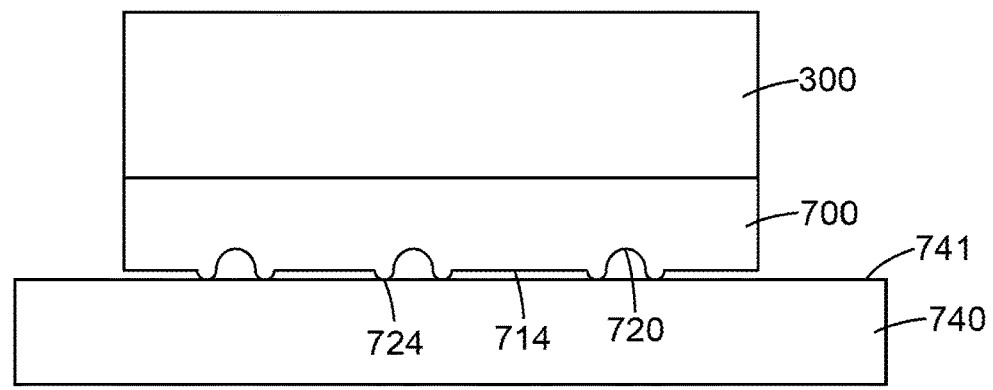
FIG. 3A is a schematic cross-sectional view of an optical stack placed on a support surface.
Figure 3B:
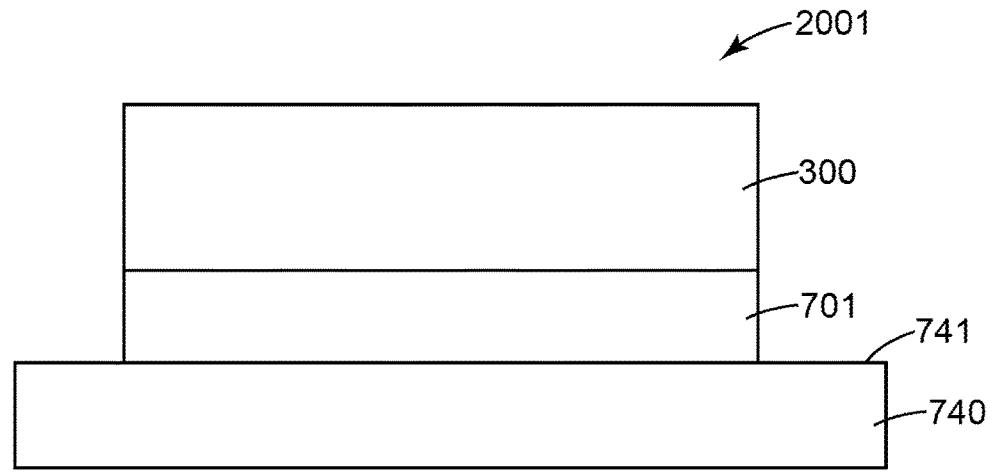
FIG. 3B is a schematic cross-sectional view of an optical stack substantially permanently bonded to a support surface.

FIG. 3A is a schematic cross-sectional view of an optical stack 2000 placed on a support surface 741. The optical stack 2000 includes an optical film 300 and an optical adhesive 700 (e.g., corresponding to optical adhesive 500 or 600). A support article 740 includes the support surface 741. The support article 740 may be a glass layer of an automobile windshield, for example. The optical adhesive 700 has a structured major surface 714 including a plurality of channels 720 formed therein. The plurality of channels 720 may be a plurality of irregularly arranged intersecting channels as described elsewhere herein or other channel geometries may be used. In the illustrated embodiment, each channel 720 includes side walls extending upwardly beyond portions of the first major surface adjacent the channel to define ridges that may be substantially co-extensive with the channel along at least a portion of a length of the channel. In FIG. 3A, the optical stack 2000 is bonded to the support surface 741 and may be removed from, or slidingly repositioned on, the support surface 741 without damage to the optical adhesive 700 or the support surface 741. In some embodiments, upon application of at least one of heat and pressure, the optical stack 2000 substantially permanently bonds to the support surface 714 and the plurality of channels 720 and (when present in adhesive 70) ridges 724 substantially disappear. This is schematically illustrated in FIG. 3B. FIG. 3B is a schematic cross-sectional view of optical stack 2001 substantially permanently bonded to the support surface 741. Optical stack 2001 corresponds to optical stack 2000 and optical adhesive 701 corresponds to optical adhesive 700 after the application of at least one of heat and pressure which results in the channels 720 and ridges 724 disappearing from the optical adhesive 701.

In some embodiments, an automotive windshield is formed by disposing the optical stack between two glass substrates with an additional adhesive between the optical film and the glass substrate opposite the optical adhesive of the optical stack. The two glass substrates may be permanently bonded together by applying heat and pressure in an autoclave process. It such embodiments, it is typically desired that the channels disappear or substantially disappear when the autoclave process is carried out.

In some embodiments, when the optical stack is placed on a support surface with the second major structured surface of the optical adhesive contacting the support surface, and the optical adhesive is heated at a temperature of about 40 to 160 deg. C, and subjected to a pressure of about 4 to 12 atmosphere, the optical stack substantially permanently bonds to the surface and the plurality of channels (and the plurality of ridges in some embodiments where ridges are present) substantially disappear.

The channels can be provided by using an embossing tool to distort a release liner and the adhesive adjacent the release liner, for example, or to emboss a release liner which is then placed in direct contact with an adhesive layer under heat and/or pressure to impart a pattern in the adhesive, for example. Alternatively, the adhesive may be directly coated onto the patterned liner and subsequently laminated to the optical film. Additionally, the channels may be directly imparted into the adhesive by contacting the adhesive with an embossing or patterned roll or idler followed by liner application to protect produced structure in roll formation. The rheology of the adhesive may be such that the plurality channels substantially disappear upon the application of heat and/or pressure when the adhesive layer is applied to a substrate. Methods for forming channels in adhesive layers are generally described in U.S. Pat. Appl. Nos. 2003/0178124 (Mikami et al.), 2007/0212535 (Sherman et al.), 2016/0114568 (Sher et al.), 2016/0115356 (Free), 2016/0130485 (Free et al.), 2017/0362469 (Sherman et al.), and 2018/0257346 (Austin et al.), for example, and in International Appl. Pub. No. WO 2019/193501 (Kallman et al.), for example.

The optical adhesives used in the optical stacks of the present description can be any suitable optical adhesives. In some embodiments, the optical adhesive includes a polyvinyl butyral, an acrylate, a thermoplastic polyurethane, an ethylene-vinyl acetate, or one or more combinations thereof. The optical adhesive may have a thickness in a range of about 10 micrometers to about 100 micrometers, or in a range of about 20 micrometers to about 60 micrometers, for example.

In some embodiments, an automotive windshield (see, e.g., FIG. 5) includes the optical stack disposed between, and bonded to, two glass substrates. The optical adhesive of the optical stack (first optical adhesive) may bond the optical film to an interior glass substrate (which faces the interior of the automobile) and a second optical adhesive may bond the optical film to an exterior glass substrate (which faces the exterior of the automobile). In some embodiments, the second optical adhesive has an average thickness at least twice an average thickness of the first optical adhesive. In some embodiments, the optical stack includes an optical film (e.g., optical film 800) disposed between a first optical adhesive (e.g., optical adhesive 700) and a second optical adhesive (e.g., adhesive layer 655). In some embodiments, at least one of the first and second optical adhesives has an exterior surface including channels as described elsewhere herein. In some embodiments, each of the first and second optical adhesives has an exterior surface including channels as described elsewhere herein. In some embodiments, at least one of the first and second optical adhesives has a tan δ as described herein. In some embodiments, each of the first and second optical adhesives has a tan δ as described herein.

Using a first optical adhesive substantially thinner than the second optical adhesive has been found to reduce ghosting from multiple reflections in a windshield as described further in International Appl. No. US2019/051733 (VanDerlofske et al.) and corresponding U.S. Prov. Pat. Appl. No. 62/735,567 filed Sep. 24, 2018 and titled "Glass Laminate Including Reflective Film".

Figure 6:
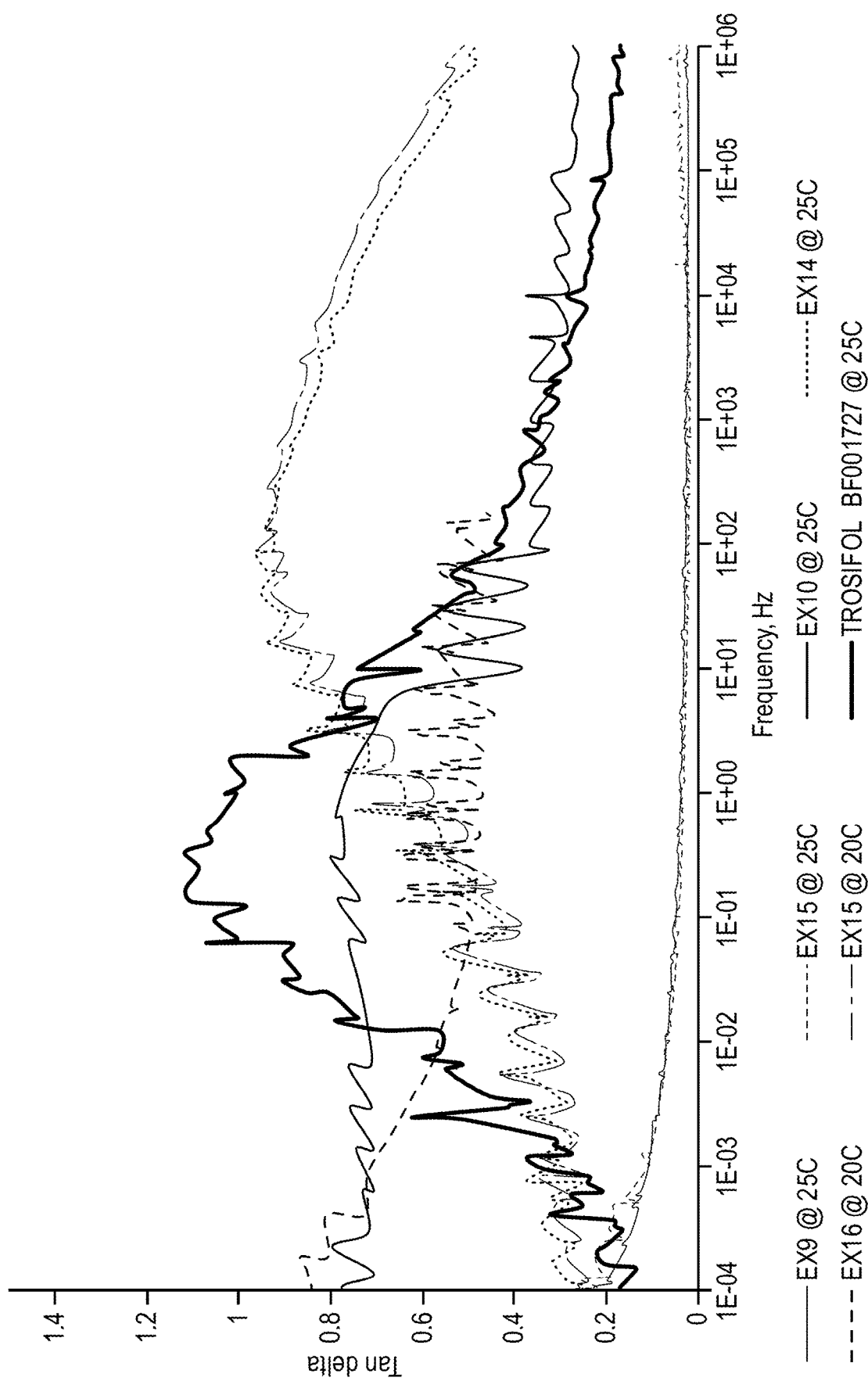
FIG. 6 is a plot of the ratio of the loss modulus G" to the storage modulus G' of various optical adhesives versus frequency.

In some embodiments, the optical adhesive has a sound absorbing property for reducing noise in an interior of a motor vehicle, such that a ratio of a loss modulus G" to a storage modulus G' of the optical adhesive for frequencies in a range from about 1000 Hz to about 3200 Hz is greater than about 0.3, or greater than about 0.4, or greater than about 0.5, or greater than about 0.8, or greater than about 1, or greater than about 1.2, or greater than about 1.5, or greater than about 1.7. In some such embodiments, this ratio, which may be referred to as tan δ (tan delta), is no more than 4, or no more than 3.5, or no more than 3 in this frequency range. In some embodiments, in some embodiments, the ratio is in a range from about 0.3 to about 4, or from about 0.4 to about 4, or from about 0.5 to about 3.5, or from about 1 to about 3 throughout the frequency range from about 1000 Hz to about 3200 Hz. FIG. 6 is a plot of the ratio of the loss modulus G" to the storage modulus G' of various optical adhesives described in the Examples versus frequency. A desired tan δ can be achieved by choosing a suitable adhesive or suitably choosing the components of the adhesive (e.g., plasticizer level). Tan δ can be measured according to the ASTM D4065-12 test standard, for example.

The optical film may be any suitable type of optical film. For example, the optical film may be a reflective polarizer or a mirror. In some embodiments, the optical film an in infrared reflector (e.g., reflecting less than 20% of visible light and at least 80% of light in a wavelength range from 900 to 1200 nm). In some embodiments, the optical film is an optical laminate including a visible light reflective polarizer and an infrared reflector laminated together. The optical film may include alternating polymeric layers or alternating inorganic layers (e.g., on a polymeric substrate), for example. In some embodiments, the optical film includes reflecting materials vapor deposited onto a polymeric film (e.g. PET). In some embodiments, the optical film is one or more of a reflective polarizer, a linear polarizer, or a circular polarizer. A linear polarizer can be converted into a circular polarizer, or vice versa, by including a quarter wave retarder. In some embodiments, the optical film includes a liquid crystal-based polarizer. In some embodiments, the optical film includes a cholesteric liquid crystal layer.

The optical film may be a multilayer optical film that provides desirable transmission and/or reflection properties at least partially by an arrangement of microlayers of differing refractive index. Such optical films have been demonstrated by coextrusion of alternating polymer layers, for example. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods. In some embodiments, the optical film is as described or International Appl. Pub. Nos. WO 2019/145860 (Haag et al.) or WO 2020/016703 (Haag et al.) or U.S. Prov. Appl. No. 62/828,632 filed Apr. 3, 2019, for example.

In automotive applications, a multilayer optical film may be laminated between glass layers using polyvinyl butyral (PVB) adhesive layers under heat and pressure. The lamination process can result in a reduced flatness of the optical film and this can result in a waviness or wrinkling that is visible when an image projected onto the glass laminate is viewed. It has been found that optical films laminated to a glass layer or between two glass layers can result in a substantially reduced waviness when the optical film has a high shrinkage under heat. For example, the optical film may have a shrinkage along a first direction of greater than 4%, or greater than 5%, or greater than 6%, or greater than 7%, or greater than 8% when heated at 150° C. for 15 minutes. The optical film may also have a shrinkage along a second direction orthogonal to the first direction of greater than 3%, or greater than 3.5%, or greater than 4%, or greater than 5%, or greater than 6%, or greater than 7%, or greater than 8% when heated at 150° C. for 15 minutes. The optical film may have a shrinkage of less than 20% along each of the first and second directions when heated at 150° C. for 15 minutes. The first and second directions can be understood to be directions in a plane of the optical film when the optical film is laid flat or directions in a tangent plane at a location on a curved optical film. In some embodiments, the alternating layers have an in-plane birefringence being a difference in refractive index along a first in-plane direction (e.g., an orientation direction of the layer) and along an orthogonal second in-plane direction, and the first and second directions along which the shrinkage is specified correspond to the first and second in-plane directions along which the in-plane birefringence is defined. In some embodiments, the first direction is a first in-plane direction along a block axis of a reflective polarizer (polarization axis along which the reflective polarizer has a highest reflectivity) and the second direction is a second in-plane direction along a pass axis of the reflective polarizer (polarization axis along which the reflective polarizer has a lowest reflectivity). In some embodiments, the block and pass axes of the reflective polarizer are defined by the alternating layers of the reflective polarizer as follows: the block axis is the axis along which the refractive index difference between adjacent layers is the largest, and the pass axis is along the orthogonal in-plane direction. Methods of making multilayer optical films having a high shrinkage are described further elsewhere herein and in PCT Publ. No. WO 2017/205106 (Stover et al.) and corresponding U.S. Pat. Appl. Pub. No. 2019/0196076 (Stover et al.) and U.S. Prov. Pat. Appl. No. 62/828,632 filed on Apr. 3, 2019 and titled "Optical Film and Glass Laminate".

It has also been found that an optical film (e.g., a reflective polarizer) with both high index layers and low index layers that have some degree of crystallinity developed during stretching due to the low stretching temperature of polyethylene terephthalate, for example, are especially suited for automotive applications, for example. Moreover, it has been found that optical films such as multilayer reflective polarizers in which both the high index layers and the low index layers develop asymmetric index of refraction through stretching can be useful in automotive or other applications. For example, such films have been found to exhibit better inhibition of haze after exposure to heat (e.g., in an automobile exposed to sunlight) as described further in PCT Publ. No. WO 2019/145860 (Haag et al.) and corresponding U.S. Prov. Pat. Appl. No. 62/622,526 filed on Jan. 26, 2018 and titled "Multilayer Reflective Polarizer with Crystalline Low Index Layers".

Figure 4A:
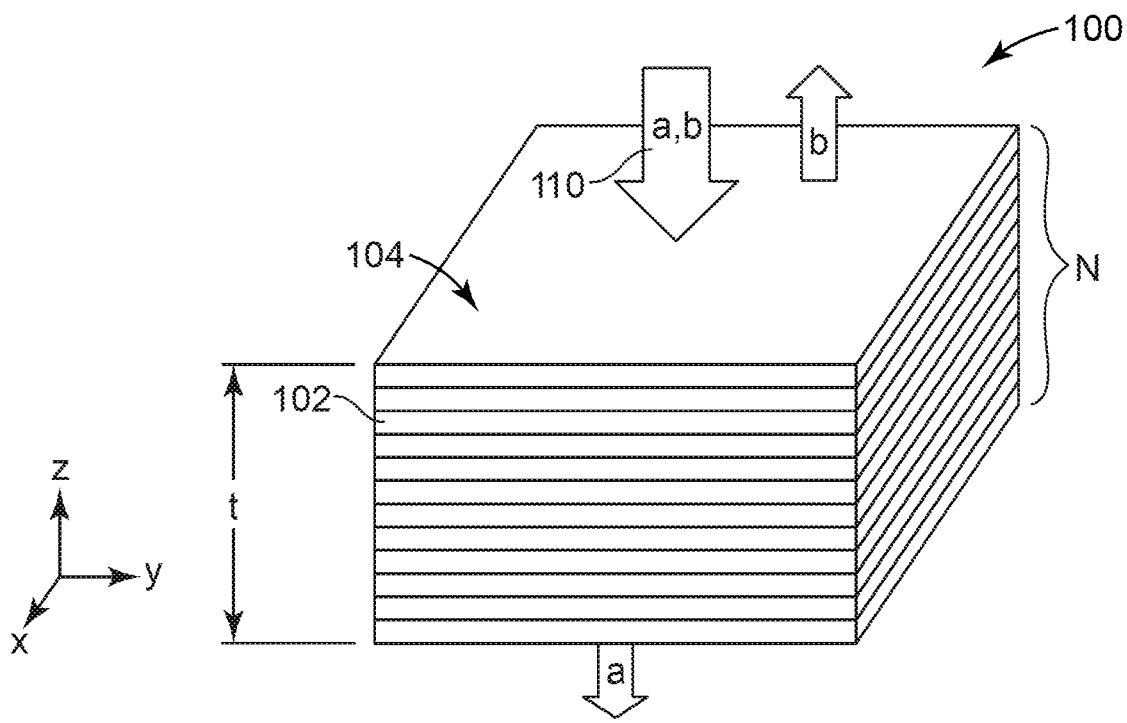
FIG. 4A is a schematic perspective view of an optical film.
Figure 4B:
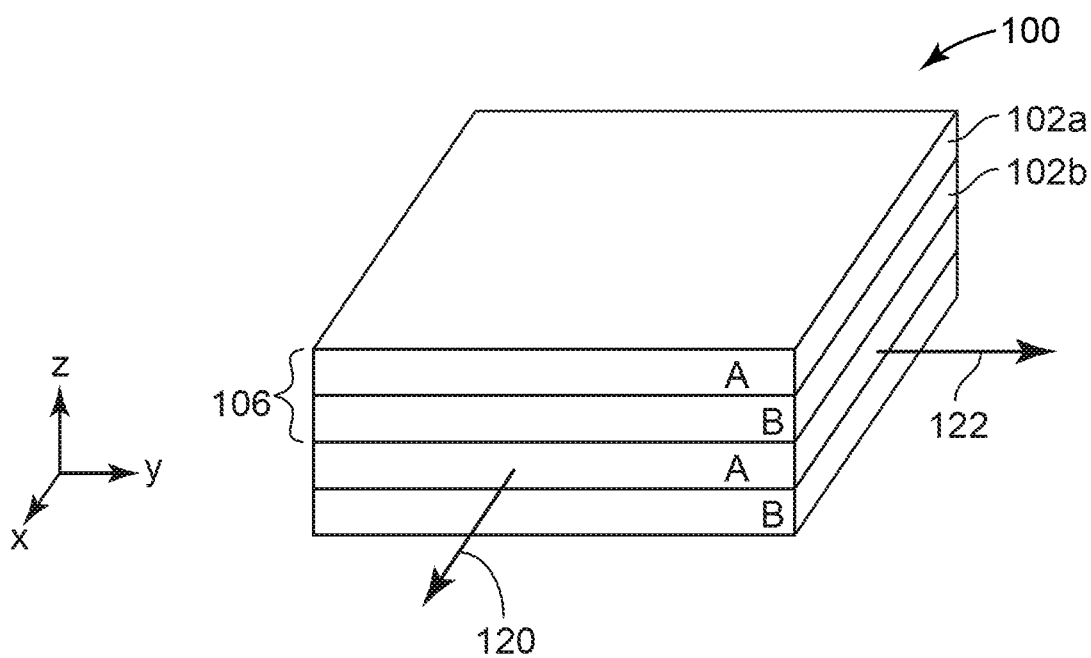
FIG. 4B is a schematic perspective view of a segment of the optical film of FIG. 4A.

FIG. 4A is a schematic perspective view of an optical film 100 which may be a reflective polarizer, and which may be used in any of the glass laminates described elsewhere herein. FIG. 1B is a schematic perspective view of a segment of the optical film 100. Optical film 100 includes a plurality of layers 102 having a total of (N) layers. The layers may be or include a plurality of alternating polymeric interference layers. FIG. 1B illustrates alternating higher index (A-layers) and lower index (B-layers) layers 102a and 102b. The higher index layers have an index in at least one direction greater than an index of the lower index layers in the same direction. The higher index layers 102a may be referred to as first layers and the lower index layers 102b may be referred to as second layers.

In some embodiments, the plurality of alternating first and second polymeric layers 102a and 102b include less than about 900 layers, or less than about 500 layers, or less than about 300 layers. In some embodiments, the plurality of alternating first and second polymeric layers 102a and 102b include at least about 50 layers, or at least about 100 layers, or at least about 200 layers, or include a total number (N) of layers in a range of about 200 to about 300 layers, for example. In some embodiments, optical film 100 has an average thickness t of less than about 500 microns, or less than about 200 microns, or less than about 100 microns, or less than about 50 microns. The average thickness refers to the thickness average over the area of the optical film. In some embodiments, the thickness is substantially uniform so that the thickness of the optical film is substantially equal to the average thickness t. In some embodiments, the optical film is formed into a curved shape and has a thickness variation resulting from the forming process. In some embodiments, each polymeric layer 102 has an average thickness of less than about 500 nm.

During use, light incident on a major surface of optical film 100 (e.g., film surface 104), depicted by incident light 110 may enter a first layer of optical film 100 and propagate through the plurality of interference layers 102, undergoing select reflection or transmission by optical interference depending on the polarization state of incident light 110. Incident light 110 may include a first polarization state (a) and a second polarization state (b) that are be mutually orthogonal to one another. In some embodiments, the optical film 100 is a reflective polarizer and the first polarization state (a) may be considered as the "pass" state while the second polarization state (b) may be considered as the "block" state. In some embodiments, optical film 100 is a polarizer oriented along a stretch axis 120 and not oriented along an orthogonal axis 122. In such embodiments, the polarization state of normally incident light having an electric field along the axis 122 is the first polarization state (a) and the polarization state of normally incident light having an electric field along the axis 120 is the second polarization state (b). The axis 122 may be referred to as the pass axis and the axis 120 may be referred to as the block axis. In some embodiments, as incident light 110 propagates through plurality of interference layers 102, portions of the light in the second polarization state (b) is reflected by adjacent interference layers resulting in the second polarization state (b) being reflected by optical film 100, while a portion of the light in the first polarization state (a) collectively passes through optical film 100.

In some embodiments, optical film 100 has a first average reflectance for a first polarization state in a predetermined wavelength range (e.g., the visible wavelength range of 400 nm to 700 nm or other visible wavelength ranges described elsewhere herein) at a predetermined angle of incidence (e.g., an angle of incidence (angle of incident light ray relative to surface normal) of 0 degrees or 60 degrees) and a second average reflectance for an orthogonal second polarization state in the predetermined wavelength range at the predetermined angle of incidence, where the second average reflectance greater than the first average reflectance. For example, in some embodiments, the second average reflectance is at least 20 percent and the first average reflectance is less than 15 percent. In some embodiments, the optical film 100 is a reflective polarizer having an average reflectance for normally incident light in a predetermined wavelength range polarized along a block axis of at least 20 percent and an average reflectance for normally incident light in the predetermined wavelength range polarized along a pass axis of less than 15 percent. In some embodiments, the average reflectance for normally incident light in the predetermined wavelength range polarized along the block axis is in a range of 25 to 75 percent. In some embodiments, the average reflectance for normally incident light in the predetermined wavelength range polarized along the pass axis is less than 10 percent.

Interference layers or microlayers may be described as reflecting and transmitting light primarily by optical interference when the reflectance and transmittance of the interference layers can be reasonably described by optical interference or reasonably accurately modeled as resulting from optical interference. Adjacent pairs of interference layers having different refractive indices reflect light by optical interference when the pair has a combined optical thickness (refractive index (along the block axis in the case of a reflective polarizer) times physical thickness) of ½ the wavelength of the light. Interference layers typically have a physical thickness of less than about 500 nm, or less than about 300 nm, or less than about 200 nm. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference. Noninterference layers typically have a physical thickness of at least 1 micrometer, or at least 5 micrometers. The interference layers 102 may be a plurality of polymeric interference layers reflecting and transmitting light primarily by optical interference in the predetermined wavelength range. The average thickness of the optical film including the interference layers and the noninterference layers may be less than about 500 microns.

In some embodiments, optical film 100 includes a plurality of alternating first and second layers 102a and 102b, the first layers 102a having a first in-plane birefringence being a difference in refractive index of the first layer 102a along a first in-plane direction 120 and a refractive index of the first layer 102a along a second in-plane direction 122, the second layers 102b having a second in-plane birefringence being a difference in refractive index of the second layer 102b along the first in-plane direction 120 and a refractive index of the second layer 102b along the second in-plane direction 122. In some embodiments, the second in-plane birefringence is less than the first in-plane birefringence and greater than 0.03. In some embodiments, the refractive indices along the first and second in-plane directions and along the thickness direction for each first layer 102a is the same as for each other first layer 102a. In some embodiments, the refractive indices along the first and second in-plane directions and along the thickness direction for each second layer 102b is the same as for each other second layer 102b. In some embodiments, the optical film 100 is a reflective polarizer including a plurality of alternating first and second layers 102a and 102b where the first layers 102a includes polyethylene terephthalate homopolymer, and the second layers 102b includes glycol-modified co(polyethylene terephthalate). In some embodiments, each first layer 102a is a polyethylene terephthalate homopolymer layer, and each second layer 102b is a glycol-modified co(polyethylene terephthalate) layer. In some embodiments, the optical film 100 has a shrinkage along the first in-plane direction 120 (or block axis 120) of greater than 4% and a shrinkage along the second in-plane direction 122 (or pass axis 122) of greater than 3% when heated at 150° C. for 15 minutes. In some embodiments, the shrinkage along the first direction 120 is greater than 5%, or 6%, or 7%, or 8% when heated at 150° C. for 15 minutes. In some such embodiments or in other embodiments, the shrinkage along the second direction 122 is greater than 3.5%, or 4%, or 5%, or 6%, or 7%, or 8% when heated at 150° C. for 15 minutes. In some embodiments, the shrinkage along the first direction 120 and the shrinkage along the second direction 122 are each greater than 5%, or 6%, or 7%, or 8% when heated at 150° C. for 15 minutes. In some embodiments, a difference $\Delta n1$ in refractive index between the first and second layers 102a and 102b along the first in-plane direction 120 is at least 0.03, and a difference $\Delta n2$ in refractive index between the first and second layers 102a and 102b along the second in-plane direction 122 has an absolute value $|\Delta n2|$ less than $\Delta n1$.

In some cases, the microlayers or interference layers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength $\lambda$ is twice the overall optical thickness of the optical repeat unit. The f-ratio is a ratio of the optical thickness of the first layer (assumed to be the higher index layer) in an optical repeat unit of first and second layers to the total optical thickness of the optical repeat unit. The f-ratios of the optical repeat units is often constant or substantially constant through the thickness of the optical film but can vary in some embodiments as described in U.S. Pat. No. 9,823,395 (Weber et al.), for example. The f-ratio of an optical film is the average (unweighted mean) of the f-ratios of the optical repeat units. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and where the x-axis is oriented within the plane of the film to maximize the magnitude of $\Delta n_x$. In these coordinates, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is determined by specifying that $\Delta n_x$ be non-negative. In other words, the refractive index differences between two layers forming an interface are $\Delta n_j = n_{1j} - n_{2j}$, where $j = x$, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A conventional multilayer film is made by co-extrusion of a large number, e.g. tens or hundreds of layers of two alternating polymers A, B, possibly followed by passing the multilayer extrudate through one or more multiplication die, and then stretching or otherwise orienting the extrudate to form a final film. The resulting film is typically composed of many of individual microlayers—hundreds or many hundreds—whose thicknesses and refractive indices are tailored to provide one or more reflection bands in desired region(s) of the spectrum, such as in the visible or near infrared. To achieve desired reflectivities with a reasonable number of layers, adjacent microlayers typically exhibit a difference in refractive index ($\Delta n_x$) for light polarized along the x-axis of at least 0.03, or at least 0.04. In some embodiments, materials are selected such that the difference in refractive index for light polarized along the x-axis is as high as possible after orientation. If reflectivity is desired for two orthogonal polarizations, then the adjacent microlayers also can be made to exhibit a difference in refractive index ($\Delta n_y$) for light polarized along the y-axis of at least 0.03, or at least 0.04.

In certain embodiments, multilayer reflective polarizers may be useful in automotive applications. For example, multilayer reflective polarizers may be used on or near at least a portion of a vehicle windshield. This application differs significantly from traditional liquid crystal display applications, because—for safety reasons—a driver should still be able to observe the road or surrounding environment through the multilayer reflective polarizer. Further, other drivers should not be dazzled or have their vision impaired by a bright reflection off the driver's windshield. A highly reflective (for one polarization state), high performance traditional reflective polarizer will not achieve these desired properties.

Further, previously known reflective polarizers are sensitive to the processing and environmental exposure involved in automotive assembly and general use. For example, reflective polarizers may be used with, processed with, or laminated to polyvinyl butyral (PVB) for safety glass shatter resistance. A component of the PVB-based material can penetrate and degrade conventionally made and designed reflective polarizers under the high-temperature processing used to form laminated windshield components. As another example, polyethylene naphthalates—particularly polyethylene naphthalates (PEN) including NDC (dimethyl-2,6-naphthalenedicarboxylate)—which are used as polymers and/or copolymers in many commercially available reflective polarizers, will yellow when exposed to ultraviolet radiation. The vehicle environment provides ample exposure to solar radiation, which will degrade the reflective polarizer over time. In such an ambient environment, spontaneous large-size crystallization may also occur, developing haze in the reflective polarizer. In some embodiments, reflective polarizers described herein do not include polyethylene naphthalate. In some embodiments, reflective polarizers described herein do not contain naphthalene-2,6-dicarboxylic acid. In some embodiments, reflective polarizers described herein do not have a refractive index in any layer, along any direction, greater than 1.7, measured at 550 nm.

Multilayer optical films are typically formed from alternating layers of two different polymers. One layer is a layer capable of developing birefringence when oriented. Because almost all polymers used in the formation of multilayer optical films increase in refractive index when stretched, this layer is also typically known as the high index layer (or high index optical (HIO) layer). The other layer of the alternating polymer layers is typically an isotropic layer, having an index of refraction equal or less than the indices of refraction of the high index layer. For this reason, this layer is typically referred to as the low index layer (or low index optical (LIO) layer). Conventionally, the high index layer is crystalline or semi-crystalline, while the low index layer is amorphous. This has been based at least on the belief that in order to get high enough block axis reflectivity (based on the mismatch between the high index layer and the low index layer along a certain in-plane direction) and low enough pass axis reflectivity (based on the matching between the high index layer and the low index layer along a second, orthogonal in-plane direction), that an amorphous material should be used.

It has now been found that a multilayer reflective polarizer with both high index layers and low index layers that have some degree of crystallinity developed during stretching due to the low stretching temperature of polyethylene terephthalate are especially suited for automotive applications. Accordingly, in some embodiments, a reflective polarizer includes a plurality of alternating first polymer layers and second polymer layers, where each of the first polymer layers and the second polymer layers exhibits crystallinity. Additionally, it has been found that multilayer reflective polarizers in which both the high index optical layers and the low index optical layers develop asymmetric index of refraction increases through stretching can be useful in automotive application. In some embodiments, each of the high index layers and the low index layers may develop or have an in-plane birefringence of at least 0.03 or at least 0.04. The in-plane birefringence is the difference in refractive index along an in-plane orientation direction (typically the direction where the oriented layers have the highest refractive index) and an orthogonal in-plane direction. For example, for a film in the x-y plane oriented along the x-direction, the in-plane birefringence is $n_x - n_y$. In some embodiments, a reflective polarizer having a shrinkage in any of the ranges described elsewhere herein when heated at 150° C. for 15 minutes includes a plurality of alternating first polymer layers 102a and second polymer layers 102b where each layer of the first polymer layers 102a and the second polymer layers 102b has an in-plane birefringence of at least 0.03, the in-plane birefringence being a difference in refractive index of the layer along a first in-plane direction 120 and a refractive index of the layer along an orthogonal second in-plane direction 122. In some embodiments, for at least one in-plane direction, the difference in refractive index between each of the first polymer layers and the second polymer layers is at least 0.03 or at least 0.04 (e.g., in a range of 0.03 or 0.04 to 0.1 or 0.15 or 0.25). In some embodiments, a difference $\Delta n1$ in refractive index between each of the first polymer layers and the second polymer layers along the first in-plane direction 120 is at least 0.03, and a difference $\Delta n2$ in refractive index between each of the first polymer layers 102a and the second polymer layers 102b along the second in-plane direction 122 has an absolute value $|\Delta n2|$ less than $\Delta n1$. In some embodiments, $\Delta n1$ is at least 0.04. In some such embodiments or in other embodiments, $|\Delta n2|$ is less than 0.04, or less than 0.03, or less than 0.02. The refractive index is determined at a wavelength of 532 nm, except where indicated differently.

During certain intermediate stretching steps, certain multilayer optical films may have similar birefringent properties; however, these films were subsequently subject to a heat setting process that minimized the birefringence in at least one of the layers (typically the low index, or isotropic layer) in order to maximize the block axis (stretch axis) reflectivity, meaning the final film (i.e., the film in roll form or the converted film) did not exhibit these properties. In some embodiments, the optical film or reflective polarizer has at least four edges (e.g., a final film in roll form or a converted film having at least four edges). In some embodiments, the high index layers are selected to be polyethylene terephthalate (PET) and the low index layers are selected to be a copolyester of polyethylene terephthalate with cyclohexane dimethanol used as a glycol modifier (PETG, such as available from Eastman Chemicals, Knoxville, Tenn.). In some embodiments, the high index layers are selected to be PET and the low index layers are selected to be a 50:50 (by weight) blend of PETG and PCTG (also a polyethylene terephthalate with cyclohexane dimethanol as a glycol modifier, but with twice the modifier as for PETG, available from Eastman Chemicals, Knoxville, Tenn.). In some embodiments, the high index layers are selected to be PET and the low index layers are selected to be a 33:33:33 (by weight) blend of PETG, PCTG, and an "80:20" copolyester derived from 40 mol % terephthalic acid, 10 mol % isophthalic acid, 49.75 mol % ethylene glycol, and 0.25 mol % trimethyl propanol. Other copolyesters may be useful as or in low index layers described herein. In some embodiments, an optical film such as a reflective polarizer includes alternating first and second layers where each first layer includes polyethylene terephthalate homopolymer and each second layer includes glycol-modified co(polyethylene terephthalate). For example, in some embodiments, each second layer includes glycol-modified co(polyethylene terephthalate) which includes a first glycol-modified co(polyethylene terephthalate) and optionally a different second glycol-modified co(polyethylene terephthalate). In some embodiments, each second layer further includes a copolyester different from the first and second glycol-modified co(polyethylene terephthalate)s.

Reflective polarizers or other optical films including materials such as the exemplary sets above have been found to exhibit better inhibition of haze after high temperature exposure, due to the crystallization being developed gradually during processing rather than spontaneously (with accompanying larger crystal sites) during exposure to radiation or heat. Further, cosmetic and appearance issues such as wrinkling or delamination appear to occur significantly less frequently with the crystalline materials combinations exemplified herein. Reflective polarizers with crystallinity in both the high index and the low index layers also perform better with respect to chemical resistance and permeability (edge ingress) of other materials. Benefits of the material combinations described herein are described further in PCT Publ. No. WO 2019/145860 (Haag et al.).

Shrinkage of the optical films of the present description may be larger than conventional multilayer optical films. If has been found that then an optical film is laminated to a glass layer or between glass layers that a high degree of shrinkage (e.g., greater than 3% shrinkage along each of two orthogonal in-plane directions and greater than 4% shrinkage along at least one in-plane direction) can substantially reduce or prevent distortion (e.g., wrinkles) in the optical film during the lamination. The shrinkage can be controlled by controlling the stress during cooling of the film after stretching the film. It has generally been found that a higher stress during this cooling results in a larger shrinkage. In some embodiments, after stretching the film a heat set is applied. The heat set can be carried out in the last zones of the tenter oven used to orient the film as described in U.S. Pat. No. 6,827,886 (Neavin et al.). Typically, such heat set processes are used in order to reduce or minimize the shrinkage of the film when heat is subsequently applied to the film. When it is desired to minimize the subsequent shrinkage of the film, the heat set temperature may be set to the highest temperature that does not result in film breakage in the tenter and the film can be relaxed in the transverse direction in the vicinity of the heat-set zone which decreases the tension of the film. Higher shrinkage, particularly in the machine direction (typically along the pass axis when the optical film is a reflective polarizer) can be achieved by reducing the heat set temperature, by reducing the duration of the heat set treatment for a given heat set temperature and/or by eliminating the heat set step. Higher shrinkage, particularly in the transverse direction (typically along the block axis when the optical film is a reflective polarizer), can be achieved reducing the relaxation of the film in the block direction. This can be done, for example, by adjusting the spacing between the tenter rails after heat setting. Reducing this spacing is often referred to as toe-in. The effects of heat set temperature and toe-in on film shrinkage are described in U.S. Pat. No. 6,797,396 (Liu et al.), for example. Thus, by controlling the heat set and toe-in conditions, desired shrinkages in the transverse direction (e.g., greater than 4%, or greater than 5%, or greater than 6%, or greater than 7%, or greater than 8%; and in some embodiments, less than 20%, or less than 15%) and in the machine direction (e.g., greater than 3%, or greater than 3.5%, or greater 4%, or greater than 5%, or greater than 6%, or greater than 7%, or greater than 8%; and in some embodiments, less than 20%, or less than 15%, or less than 12%) when the optical film heated at 150° C. for 15 minutes can be achieved. Shrinkage of an optical can be determined according to the ASTM D2732-14 test standard, "Standard Test Method for Unrestrained Linear Thermal Shrinkage of Plastic Film and Sheeting", for example.

Optical films, such as reflective polarizers, described herein also may have an f-ratio that is higher than 0.5. In some embodiments, the f-ratio may be at least 0.55, at least 0.6, at least 0.65, at least 0.7, at least 0.75, at least 0.8, or at least 0.85. The shift in f-ratio higher than 0.5 dampens the first order reflection bands of the multilayer reflective polarizer in favor of higher order reflection bands, effectively reducing the reflectivity of the polarizer for the designed wavelength range. Similar optical effects are observed for f-ratios lower than 0.5; for example, f-ratios less than 0.45, less than 0.4, less than 0.35, less than 0.3, less than 0.25, less than 0.2, or even less than 0.15. Combined with the lesser developed birefringence that occurs from stretching PET (compared to PEN or a coPEN), these reflective polarizers may need to include more layers to reach desired levels of reflectivity. Counterintuitively, this is a design feature in some embodiments. For weak reflective polarizers, microlayer caliper variation can have a substantial and disproportionate effect on the overall spectrum of the film. By making each individual microlayer pair even weaker, layers can be added to the design that reinforce and overlap the reflective bands of neighboring microlayer pairs. This smooths the spectrum and allows for more consistent performance, regardless of position on the film web or even from roll to roll. Optical films described herein may have at least 50 layers, at least 100 layers, at least 150 layers, at least 200 layers, or at least 250 layers.

Reflective polarizers or other optical films described herein may have resistance to haze even after exposure to heat. In some embodiments, reflective polarizers may have no more than 1% haze when measured after 100 hours' exposure to 85° C., 95° C., or even 105° C. In some embodiments, reflective polarizers may have no more than 2% haze after 100 hours' exposure to 105° C. or even 120° C. In some embodiments, reflective polarizers may have no more than 3% or 3.5% haze after 100 hours' exposure to 120° C. In some embodiments, the transmission of these reflective polarizers may be unaffected or substantially unaffected by even a short exposure to extreme heat, such as in an annealing step. In some embodiments, the transmission spectrum from 400 nm to 800 nm drops by no more than 10% or even no more than 5% after a 232° C. (450° F.) for 30 seconds annealing step.

Figure 5:
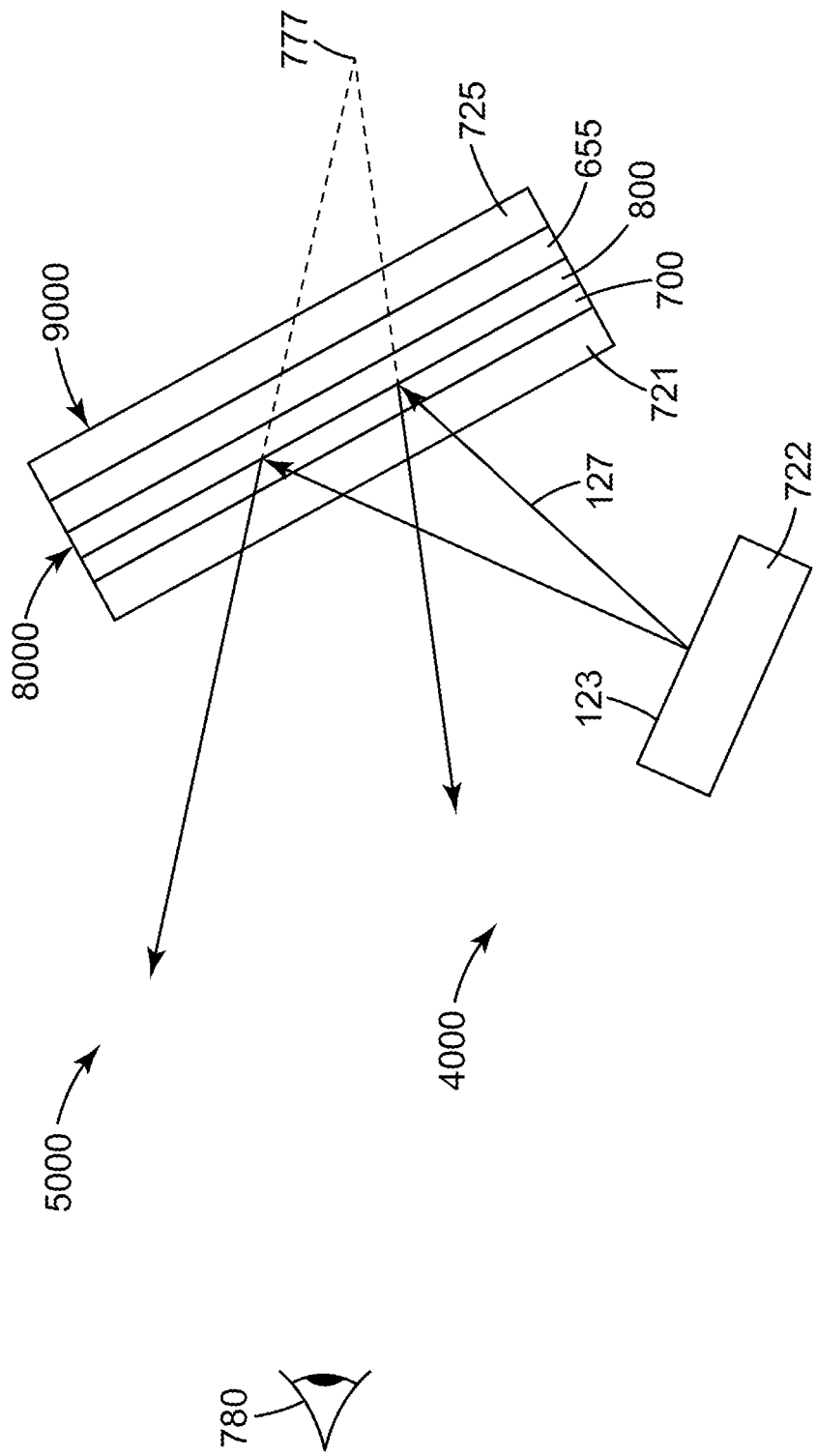
FIG. 5 is a schematic cross-sectional view of a display system.

FIG. 5 is a schematic cross-sectional view of a display system 5000 for displaying a virtual image 777 to a viewer 780. An automotive windshield 9000 includes an optical assembly 8000 disposed between, and bonded to, two glass substrates 721, 725. The optical assembly 8000 includes an optical film 800 and an (first) optical adhesive 700. The optical assembly 8000 may correspond to any optical stack described elsewhere herein after channels (and, in some embodiments, ridges when initially present) in the optical adhesive 700 are substantially removed during the lamination of the automotive windshield, for example. The optical assembly 8000 is bonded to an interior glass substrate 721 through the first optical adhesive 700 and to an exterior glass substrate 725 through an adhesive layer 655 which may be referred to as a second optical adhesive 655.

In some embodiments, an automotive windshield 9000 includes an optical assembly 8000 disposed between, and bonded to two glass substrates 721, 725. The optical assembly 8000 may be prepared by disposing any optical stack described elsewhere herein between the two glass substrates and applying at least one of heat and pressure such that optical adhesive 700 substantially permanently bonds to one (721) of the first and second glass substrates 721, 725 and the plurality of channels substantially disappear. An adhesive layer 655 may be disposed between the optical stack and the glass substrate 725, or the optical stack may further include the adhesive layer 655 opposite the optical adhesive of the optical stack, so that the optical stack substantially permanently bonds to the first and second glass substrates.

The display system 5000 further includes a display 722 configured to emit an image 123, and a projection system 4000 including an optical assembly 8000 and/or an automotive windshield 9000 which includes the optical assembly 8000. The projection system 4000 forms a virtual image 777 of the image 123 emitted by the display 722 for viewing by a viewer 780.

In some embodiments, the display 722 is or includes a liquid crystal display, an organic light emitting diode display, a laser display, a digital micromirror display, or a laser display. Useful displays and display systems include those described in U.S. Pat. Appl. Publ. Nos. 2015/0277172 (Sekine), 2003/0016334 (Weber et al.), 2005/0002097 (Boyd et al.), 2005/0270655 (Weber et al.), 2007/0279755 (Hitschmann et al.), and 2012/0243104 (Chen et al.), for example, and in U.S. Pat. No. 5,592,188 (Doherty et al.), for example.

In some embodiments, the optical assembly 8000, or any of the optical stacks described elsewhere herein, includes additional layers or elements. For example, an additional layer or element may be disposed between the optical film and the optical adhesive of the optical stack or an additional layer or element may be disposed on the optical film opposite the optical adhesive. The layer or element may be an optical layer or optical coating (e.g., a Bragg grating), or an additional optical film such as an infrared mirror film, or may be at least one of a heating element or a heat spreading layer. For example, the optical assembly 8000 may include at least one of a heating element or a heat spreading layer and the display system 5000 may include a thermal control system for deicing or defogging the automotive windshield 9000.

In some embodiments, the additional layer(s) or element(s) is or includes a diffraction grating such as Bragg grating. For example, a waveguide used in a head-up display (HUD) may utilize a grating as described in U.S. Pat. Appl. Publ. Nos. 2015/0160529 (Popovich et al.), 2018/0074340 (Robbins et al.) and 2018/0284440 (Popovich et al.), for example, or in U.S. Pat. No. 9,715,110 (Brown et al.), for example.

In some embodiments, the additional element(s) or layer(s) is at least one of a heating element or a heat spreading layer. Heating element(s) may be used to defog or deice a windshield and heating spreading element(s) may be used to spread heat across a larger area of the windshield in embodiments where the heating element(s) are in a periphery of the windshield, for example. In some embodiments, the additional layer or element is a resistive heating element which may be substantially transmissive to normally incident visible light (e.g., transmitting at least 60% of normally incident light in a wavelength range of 400 nm to 700 nm). In some embodiments, the additional layer or element is a resistive heating element, and the resistive heating element and the optical film are each substantially transmissive in a predetermined radio frequency range (e.g., in a range from 3 kHz or 30 kHz to 30 GHz or 3 GHz). Windshields with heating elements are known in the art and are described in U.S. Pat. No. 2,526,327 (Carlson), U.S. Pat. No. 5,434,384 (Koontz), U.S. Pat. No. 6,180,921 (Boaz), U.S. Pat. No. 8,921,739 (Petrenko et al.), for example, and in U.S. Pat. Appl. Nos. 2008/0203078 (Huerter) and 2011/0297661 (Raghavan et al.), for example.

In some embodiments, an optical stack includes at least one of a heating element or a heat spreading layer. In some embodiments, the at least one of the heating element or the heat spreading layer includes one or more resistive elements which may include wires, nanowires (e.g., silver nanowires), or indium tin oxide (ITO), for example. In some embodiments, the at least one of the heating element or the heat spreading layer includes a heat spreading layer which may include nanowires, carbon nanotubes, graphene, or graphite, for example. In some embodiments, the optical stack includes a heat spreading layer covering a majority of a total area of a major surface of the optical film.

Heating elements, heat spreading elements and automotive thermal control systems utilizing such elements are described further in U.S. Prov. Pat. Appl. No. 62/828,632 filed on Apr. 3, 2019 and titled "Optical Film and Glass Laminate".

EXAMPLES

Preparative Liner Example P1 (85% Plano)

Liner L1, which was a particle filled, embossed release liner, was prepared as described in U.S. Pat. No. 5,296,277 (Wilson et al.), column 11, table 1 with surface depressions of 7225/in$^2$ at a density of 85 lines per inch. Liner F1 was a 46 um thick plasticized, white flexible and conformable vinyl (PVC) film which is used 3M Print Wrap Film IJ180C-10 available from 3M Company (St. Paul, Minn.).

A pattern was embossed into release liner L1 by passing the release liner between a silicone rubber roll and an engraved metal roll. This produced an Irregular Channel Embossed Release Liner. The engraved pattern was a series of recessed lines (channels) that were pseudo-randomly (irregularly) placed onto the surface of the embossing roll such that the plano-area to total surface area ratio was 85%. For clarity, pseudo-random patterning in this context is patterning that can appear to be random by casual observation, but upon closer observation one would note repeated features. In this case 8 discrete planer orientations (11, 73, 53, 23, 17, 71, 47 and 29 degrees from crossweb orientation) were used for placing the individual lines which were roughly 30 micrometers deep by 60 micrometers wide at the center of the channel tapering to zero in depth and width at the end points. The lines were roughly 4.3 mm (+/−0.2 mm) long. The pattern of the lines was as generally indicated in FIG. 1C. The taper profile (cross section) was a continuous arch with the maximum depth and width proportion defined by an arch with a 21.3 micrometer radius transitioning to a side wall 60 degree draft angle across a width of 59.2 micrometers. The channel cross-section was as illustrated in FIG. 8 of International Appl. No IB2019/052705 (Kallman et al.)

An acrylic pressure sensitive adhesive solution as described as Adhesive Solution 1 in U.S. Pat. No. 5,296,277 (Wilson et al.) and containing 0.15 parts of bis amide and 16 parts of tackifier) prepared at a solids content of 38.5% as prepared. The tackifier used was Terpene Phenol, available from Kraton Corporation Houston, Tex. as "SYLVARES" TP2019. The acrylic pressure sensitive adhesive solution was slot die coated and dried onto the structured side of the Irregular Channel Embossed Release Liner using a continuous coating/dryer line. The exposed adhesive side of the Adhesive Coated Irregular Channel Embossed Release Liner was laminated at room temperature to film F1 forming an Irregular Channel Structured Adhesive Film. This film was then removed, removing all particles from the release liner, leaving a particle free liner (Liner P1).

Preparative Liner Example P2 (75% Plano)

Liner P2 was generated similarly to that of Liner PL however the target number of channels was increased such that the plano-area to total surface area ratio was designed for 75%.

Preparative Liner Example P3 (65% Plano)

Liner P3 was generated similarly to that of Liner PL however the target number of channels was increased such that the plano-area to total surface area ratio was designed for 65%.

Preparative Liner Example P4 (55% Plano)

Liner P4 was generated similarly to that of Liner P1, however the target number of channels was increased such that the plano-area to total surface area ratio was designed for 55%.

Unless otherwise noted, all parts, percentages, ratios, etc. in the Examples and the rest of the specification are by weight. Solvents were obtained from Sigma-Aldrich except where indicated differently.

Materials Used in the Examples

| Abbreviation | Description |
| --- | --- |
| MOWITAL B20H | Polyvinyl butyral obtained from Kuraray (Tokyo, JP) |
| MOWITAL B60H | Polyvinyl butyral obtained from Kuraray (Tokyo, JP) |
| TEG-EH | Triethylene glycol bis(2-ethyl hexanoate) plasticizer obtained from Eastman Chemicals (Knoxville, TN) |
| TREDEGAR 1035 | Structured liner obtained from Tredegar Corporation (Richmond, VA) |
| INFIANA Liner | LDPE 19000 25 μm CLR Atlas Structured Liner obtained from Infiana USA, Inc. (Malvern, PA) |
| SCOTCHCAL Liner | Structured liner obtained from 3M Company (St. Paul, MN) |
| TROSIFOL BF001727 | PVB film obtained from Kuraray (Tokyo, JP) |

A Reflective Polarizer (RP) optical film was prepared as described in International Appl. No. IB2019/050541.

Coating Solution EX1

To a 65 lbs solution of Ethanol:Toluene:Cyclohexanone (42:28:31 w/w) 7 lbs of TEG-EH was added. 28 lbs of MOWITAL B20H PVB was slowly added to the solvent blend under high shear agitation and mixed until fully dissolved to create a 35% solids solution.

Coating Solution EX2

To a 80 lbs solution of methyl ethyl ketone (MEK) 4 lbs of TEG-EH was added. 16 lbs of MOWITAL B60H PVB was slowly added to the solvent blend under high shear agitation and mixed until fully dissolved to create a 20% solids solution.

Coating Solution EX3

To a 65 lbs solution of Ethanol:Toluene:Cyclohexanone (42:28:31 w/w) 3.5 lbs of TEG-EH was added. 31.5 lbs of MOWITAL B20H PVB was slowly added to the solvent blend under high shear agitation and mixed until fully dissolved to create a 35% solids solution.

Coating Solution EX4

This solution was made according to Example 1 of U.S. Pat. Pub. No. 2006/0246296 (Xia et al.) with the exception that the amount of Polymer Additive 1 was increased to equal 30 parts compared to PSA 1 (solids). To aid in coating processability, the adhesive was diluted with a blend of methyl ethyl ketone and methanol (77.5:22.5 w/w) to provide a 20.7% solids solution.

Coating Solution EX5

This solution was made according to Example 1 of U.S. Pat. Pub. No. 2006/0246296 (Xia et al.). To aid in coating processability, the adhesive was diluted with a blend of methyl ethyl ketone and methanol (77.5:22.5 w/w) to provide a 20.7% solids solution.

Coating Solution EX6

To a 65 lbs solution of Ethanol:Toluene:Cyclohexanone (42:28:31 w/w) 35 lbs of MOWITAL B20H PVB was slowly added to the solvent blend under high shear agitation and mixed until fully dissolved to create a 35% solids solution.

Coating Solution EX7

This solution was made according to Example 1 of U.S. Pat. Pub. No. 2006/0246296 (Xia et al.) with the exception that the amount of Polymer Additive 1 was increased to equal 36 parts compared to PSA 1 (solids). To aid in coating processability, the adhesive was diluted with a blend of methyl ethyl ketone and methanol (77.5:22.5 w/w) to provide a 20.7% solids solution.

Example 1

Coating solution EX1 was applied onto RP film via slot die coating process to give a wet thickness of approximately 73 micrometers. The coated substrate was subsequently dried at 150-200 deg. F for 3 minutes to give a dry coating thickness of about 25 micrometers. LINER P1 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 2

Coating solution EX1 was applied onto RP film via slot die coating process to give a wet thickness of approximately 73 micrometers. The coated substrate was subsequently dried at 150-200 deg. F for 3 minutes to give a dry coating thickness of about 25 micrometers. LINER P2 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 3

Coating solution EX1 was applied onto RP film via slot die coating process to give a wet thickness of approximately 73 micrometers. The coated substrate was subsequently dried at 150-200 deg. F for 3 minutes to give a dry coating thickness of about 25 micrometers. LINER P3 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 4

Coating solution EX1 was applied onto RP film via slot die coating process to give a wet thickness of approximately 73 micrometers. The coated substrate was subsequently dried at 150-200 deg. F for 3 minutes to give a dry coating thickness of about 25 micrometers. LINER P4 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 5

Coating solution EX1 was applied onto RP film via slot die coating process to give a wet thickness of approximately 107 micrometers. The coated substrate was subsequently dried at 150-200 deg. F for 2 minutes to give a dry coating thickness of about 37.5 micrometers. TREDEGAR 1035 premask was placed atop the coated RP substrate such that the structured or rough surface of the premask was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 6

Coating solution EX1 was applied onto RP film via slot die coating process to give a wet thickness of approximately 107 micrometers. The coated substrate was subsequently dried at 150-200 deg. F for 2 minutes to give a dry coating thickness of about 37.5 micrometers. SCOTCHCAL Liner was placed atop the coated RP substrate such that the structured or rough surface of the premask was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 7

Coating solution EX1 was applied onto RP film via slot die coating process to give a wet thickness of approximately 107 micrometers. The coated substrate was subsequently dried at 150-200 deg. F for 2 minutes to give a dry coating thickness of about 37.5 micrometers. INFIANA Liner was placed atop the coated RP substrate such that the structured or rough surface of the premask was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 8

Coating solution EX2 was applied onto RP film via slot die coating process to give a wet thickness of approximately 125 micrometers. The coated substrate was subsequently dried at 150-200 deg. F for 3 minutes to give a dry coating thickness of about 25 micrometers. LINER P3 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 9

Coating solution EX.3 was applied onto RP film via slot die coating process to give a wet thickness of approximately 89 micrometers. The coated substrate was subsequently dried at 150-200 deg. F for 3 minutes to give a dry coating thickness of about 31.25 micrometers. LINER P3 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 10

Coating solution EX4 was applied onto RP film via slot die coating process to give a wet thickness of approximately 151 micrometers. The coated substrate was subsequently dried at 140-200 deg. F for 2 minutes to give a dry coating thickness of about 31.25 micrometers. SCOTCHCAL structured liner was placed atop the coated RP substrate such that the structured surface of the liner was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 11

Coating solution EX4 was applied onto RP film via slot die coating process to give a wet thickness of approximately 60 micrometers. The coated substrate was subsequently dried at 140-200 deg. F for 2 minutes to give a dry coating thickness of about 12.5 micrometers. Liner P3 was placed atop the coated RP substrate such that the structured surface of the liner was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 12

Coating solution EX2 was applied onto RP film via slot die coating process to give a wet thickness of approximately 125 micrometers. The coated substrate was subsequently dried at 150-200 deg. F for 3 minutes to give a dry coating thickness of about 25 micrometers. INFIANA structured liner was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 13

Coating solution EX5 was applied onto RP film via slot die coating process to give a wet thickness of approximately 151 micrometers. The coated substrate was subsequently dried at 140-200 deg. F for 2 minutes to give a dry coating thickness of about 31.25 micrometers. SCOTCHCAL structured liner was placed atop the coated RP substrate such that the structured surface of the liner was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 14

Coating solution EX5 was applied onto RP film via slot die coating process to give a wet thickness of approximately 60 micrometers. The coated substrate was subsequently dried at 140-200 deg. F for 2 minutes to give a dry coating thickness of about 12.5 micrometers. Liner P3 was placed atop the coated RP substrate such that the structured surface of the liner was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 15

Coating solution EX6 was applied onto RP film via slot die coating process to give a wet thickness of approximately 89 micrometers. The coated substrate was subsequently dried at 150-200 deg. F for 3 minutes to give a dry coating thickness of about 31.25 micrometers. LINER P3 was placed atop the coated RP substrate such that the structure of the liner was in direct contact with the coating. The combined filmstack was passed through a hot roll laminator (at 15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Example 16

Coating solution EX7 was applied onto RP film via slot die coating process to give a wet thickness of approximately 151 micrometers. The coated substrate was subsequently dried at 140-200 deg. F for 2 minutes to give a dry coating thickness of about 31.25 micrometers. SCOTCHCAL structured liner was placed atop the coated RP substrate such that the structured surface of the liner was in direct contact with the coating. The combined filmstack was passed through a hot roll laminator (15 sec/rev) containing a combination of heated steel/rubber nip rolls in which the uncoated RP interface was in contact with the steel nip roll and the non-structured face of the liner was against the rubber nip roll. The nip roll temperatures were set to 150 deg. F. The gap between nip idlers was set to 0.25 mm and pressure of 60-80 psi.

Comparative Example C1

Coating solution EX1 was applied onto RP film via slot die coating process to give a wet thickness of approximately 73 micrometers. The coated substrate was subsequently dried at 150-200 deg. F for 3 minutes to give a dry coating thickness of about 25 micrometers.

Comparative Example C2

Coating solution EX4 was applied onto RP film via slot die coating process to give a wet thickness of approximately 122 micrometers. The coated substrate was subsequently dried at 140-200 deg. F for 2 minutes to give a dry coating thickness of about 25 micrometers.

Comparative Example C3

Coating solution EX5 was applied onto RP film via slot die coating process to give a wet thickness of approximately 122 micrometers. The coated substrate was subsequently dried at 140-200 deg. F for 2 minutes to give a dry coating thickness of about 25 micrometers.

Adhesive Testing

Light Slip Tests, 2-Finger Drag Tests, and Repositionability Tests were completed on 6" flat, single strength soda lime glass. Film samples had a minimum size of 7"×7" to sufficiently overhang the glass.

Light Slip Test

The film sample was centered over glass and positioned with the adhesive coating side in contact with glass. One overhung corner was then pulled in a horizontal motion (parallel to the plane of glass) to drag the film off the glass. The result was considered to be good if the film was pulled off without shifting the glass. If the glass moved with the film, the result was considered to be poor.

2-Finger Drag Test

The film sample was positioned with the adhesive coating side in contact with glass. With a gloved hand, two fingers were pressed down into the center of the sample and the film sample was dragged towards the edge of the glass while maintaining downward pressure. If the glass moved with the film, the result was considered to be poor.

Repositionability Test

The result was considered to be good if the film could be lifted vertically off glass and moved to new position without leaving any adhesive residue on the glass, and with no disruption to coating surface.

Results of the repositionability testing are reported in the following table.

| Example | Liner | Adhesive Coating Solution | Light Slip | 2-Finger Drag | Repositionability |
|---------|-------|---------------------------|------------|---------------|-------------------|
| EX4 | P4 | EX1 | Good | Poor | Good |
| EX3 | P3 | EX1 | Good | Marginal | Good |
| EX2 | P2 | EX1 | Good | Good | Good |
| EX1 | P1 | EX1 | Good | Good | Good |
| EX8 | P3 | EX2 | Good | Poor | Good |
| EX9 | P3 | EX3 | Good | Poor | Good |
| EX6 | SCOTCHCAL | EX1 | Good | Good | Good |
| C1 | None | EX1 | Poor | Poor | Poor |
| C2 | None | EX4 | Poor | Poor | Poor |
| C3 | None | EX5 | Poor | Poor | Poor |
| EX7 | INFIANA | EX1 | Good | Good | Good |
| EX12 | INFIANA | EX2 | Good | Good | Good |
| EX10 | SCOTCHCAL | EX4 | Good | Poor | Good |
| EX13 | SCOTCHCAL | EX5 | Poor | Poor | Poor |
| EX14 | P3 | EX5 | Poor | Poor | Poor |
| EX11 | P3 | EX4 | Marginal | Poor | Good |
| EX15 | P3 | EX6 | Good | Good | Good |
| EX5 | TREDEGAR 1035 | EX1 | Good | Marginal | Good |
| EX16 | SCOTCHCAL | EX7 | Good | Marginal | Good |

Adhesive Tan δ Measurements

Tan δ was determined for various samples via Dynamical Mechanical Analysis (DMA) using either an Q800 DMA affixed with tension clamp or a Discovery HR3 both from TA Instruments. Results are plotted in FIG. 6 as a function of frequency.

Auditory Transmission Loss Measurements

Figure 7:
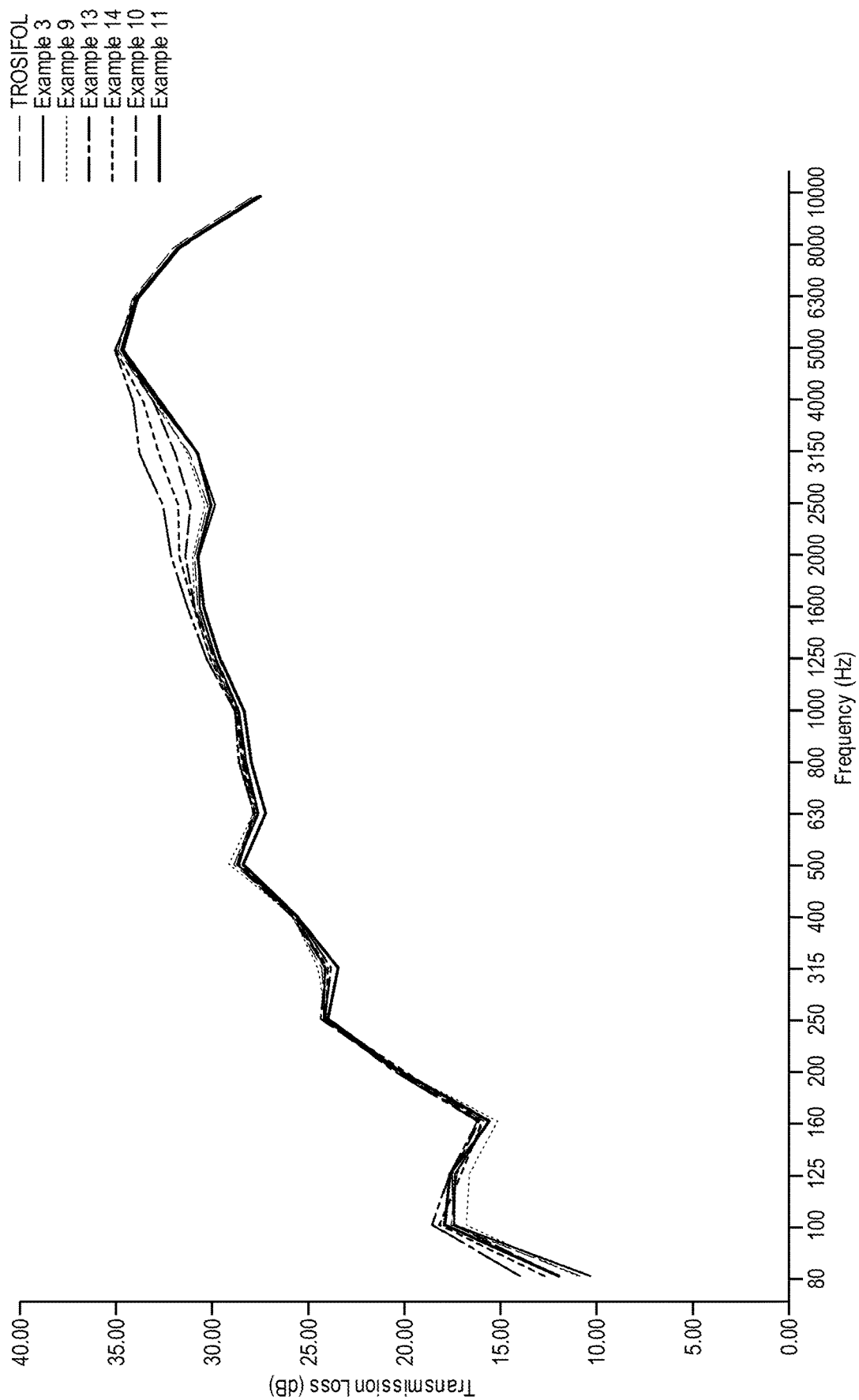
FIG. 7 is a plot of auditory transmission loss through various glass laminates.

Glass laminates including an inner glass layer and outer glass layer were prepared using various adhesive coated reflective polarizers and a 0.38 mm thick PVB layer between the reflective polarizer and the outer glass layer and the auditory transmission loss through the glass laminate was measured according to the ASTM E90-09(2016) test standard and the results are plotted in FIG. 7 as a function of frequency.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical stack comprising:
   an optical film comprising a plurality of alternating first and second polymeric layers numbering at least 50 in total, each first and second polymeric layer having an average thickness less than about 500 nm; and
   an optical adhesive disposed on the optical film and comprising a first major surface facing and bonded to the optical film, and an opposing second major structured surface comprising a plurality of irregularly arranged intersecting channels formed therein, the channels defining a plurality of substantially flat land regions therebetween, the land regions comprising at least about 50% of a total surface area of the second major structured surface, such that when the optical stack is placed on a support surface with the second major structured surface of the optical adhesive contacting the support surface, the optical stack bonds to the support surface and may be removed from, or slidingly repositioned on, the support surface without damage to the optical adhesive or the support surface, and upon application of at least one of heat and pressure, the optical stack substantially permanently bonds to the support surface and the plurality of channels substantially disappear.

2. The optical stack of claim 1, wherein the optical adhesive comprises a sound absorbing property for reducing noise in an interior of a motor vehicle, such that a ratio of a loss modulus G" to a storage modulus G' of the optical adhesive for frequencies in a range from about 1000 Hz to about 3200 Hz is greater than about 0.3.

3. The optical stack of claim 1, wherein each channel in the plurality of irregularly arranged intersecting channels is substantially straight.

4. The optical stack of claim 1, wherein the optical film is a reflective polarizer or a mirror.

5. The optical stack of claim 1, wherein the optical adhesive comprises a polyvinyl butyral, an acrylate, a thermoplastic polyurethane, an ethylene-vinyl acetate, or one or more combinations thereof.

6. The optical stack of claim 1, wherein when the optical stack is placed on a support surface with the second major structured surface of the optical adhesive contacting the support surface, and the optical adhesive is heated at a temperature of about 40 to 160 deg. C, and subjected to a pressure of about 4 to 12 atmosphere, the optical stack substantially permanently bonds to the surface and the plurality of channels substantially disappear.

7. An optical stack comprising:
   an optical film; and
   an optical adhesive adhered to the optical film and comprising a first major surface facing away from the optical film, the first major surface comprising a plurality channels formed therein, each channel comprising a side wall extending upwardly beyond a portion of the first major surface adjacent the channel to define a ridge substantially co-extensive with the channel along at least a portion of a length of the channel, such that when the optical stack is placed on a support surface with the first major surface of the optical adhesive contacting the support surface, the optical stack bonds to the support surface and may be removed from, or slidingly repositioned on, the support surface without damage to the optical adhesive or the support surface, and upon application of at least one of heat and pressure, the optical stack substantially permanently bonds to the support surface and the plurality of channels and ridges substantially disappear.

8. The optical stack of claim 7, wherein the optical film comprises a plurality of alternating first and second polymeric layers reflecting and transmitting light primarily by optical interference.

9. The optical stack of claim 8, wherein the first polymeric layers have a first in-plane birefringence being a difference in refractive index of the first layers along a first in-plane direction and a refractive index of the first layers along an orthogonal second in-plane direction, and the second polymeric layers have a second in-plane birefringence being a difference in refractive indices of the second layers along the first in-plane direction and along the second in-plane direction, the second in-plane birefringence being less than the first in-plane birefringence and greater than 0.03.

10. The optical stack of claim 9, wherein the first polymeric layers comprise polyethylene terephthalate homopolymer, and the second polymeric layers comprise glycol-modified co(polyethylene terephthalate).

11. An automotive windshield comprising an optical assembly disposed between, and bonded to two glass substrates, the optical assembly prepared by disposing the optical stack of claim 1 between the two glass substrates and applying at least one of heat and pressure such that the optical adhesive substantially permanently bonds to one of the two glass substrates and the plurality of channels substantially disappear.

12. An automotive windshield comprising an optical stack disposed between, and bonded to, an interior glass substrate and an exterior glass substrate, the optical stack comprising:
   an optical film comprising a plurality of alternating first and second polymeric layers numbering at least 50 in total, each first and second polymeric layer having an average thickness less than about 500 nm; and
   a first optical adhesive bonding the optical film to the interior glass substrate, the first optical adhesive having an average thickness in the range of about 10 micrometers to about 100 micrometers and comprising a sound absorbing property for reducing noise in an interior of a motor vehicle, such that a ratio of a loss modulus G" to a storage modulus G' of the optical adhesive for frequencies in a range from about 1000 Hz to about 3200 Hz is greater than about 0.3.

13. The automotive windshield of claim 12 further comprising a second optical adhesive boding the optical film to the exterior glass substrate, the second optical adhesive having an average thickness at least twice the average thickness of the first optical adhesive.

14. A display system for displaying a virtual image to a viewer, comprising:
   a display configured to emit an image; and
   a projection system comprising the automotive windshield of claim 12, the projection system forming a virtual image of the image emitted by the display for viewing by a viewer.

15. The display system of claim 14, wherein the display comprises a liquid crystal display, an organic light emitting diode display, a digital micromirror display, or a laser display.

* * * * *

UNITED STATES PATENT AND TRADEMARK OFFICE
CERTIFICATE OF CORRECTION

PATENT NO. : 12,117,635 B2
APPLICATION NO. : 17/438245
DATED : October 15, 2024
INVENTOR(S) : Michelle Lund Toy Page 1 of 1

It is certified that error appears in the above-identified patent and that said Letters Patent is hereby corrected as shown below:

In the Claims

<u>Column 26</u>
Line 56 (approx.), In Claim 13, delete "boding", and insert -- bonding --, therefor.

Signed and Sealed this
Thirteenth Day of May, 2025

Coke Morgan Stewart
*Acting Director of the United States Patent and Trademark Office*